US010289161B2

(12) United States Patent
Matsuzawa et al.

(10) Patent No.: US 10,289,161 B2
(45) Date of Patent: May 14, 2019

(54) HEAD-MOUNTED DISPLAY

(71) Applicant: KYOCERA Corporation, Kyoto-shi, Kyoto (JP)

(72) Inventors: Jun Matsuzawa, Kawasaki (JP);
Kouichirou Fujihara, Yokohama (JP);
Keisuke Okada, Yokohama (JP);
Tomohiro Degawa, Tokyo (JP);
Yoshiteru Kurosaki, Yokohama (JP);
Susumu Ozawa, Ebina (JP); Shingo Ito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/469,941

(22) Filed: Mar. 27, 2017

(65) Prior Publication Data
US 2017/0277222 A1 Sep. 28, 2017

(30) Foreign Application Priority Data
Mar. 28, 2016 (JP) ................................ 2016-064382

(51) Int. Cl.
G09G 5/00 (2006.01)
G06F 1/16 (2006.01)
G06F 3/01 (2006.01)
G08B 3/10 (2006.01)

(52) U.S. Cl.
CPC ............ G06F 1/1632 (2013.01); G06F 1/163 (2013.01); G06F 1/1647 (2013.01); G06F 1/1677 (2013.01); G06F 3/011 (2013.01); G08B 3/10 (2013.01)

(58) Field of Classification Search
CPC .. G02B 27/01; G02B 27/017; G02B 27/0176; G02B 2027/0178; G02C 11/10; G06F 1/163; G06F 1/1632; G06F 1/1675; G06F 3/011; G06F 3/038; G06F 3/06; G09G 3/00; G09G 3/30; G09G 3/36; G09G 5/00; H04W 4/00
See application file for complete search history.

(56) References Cited

U.S. PATENT DOCUMENTS

| | | | | |
|---|---|---|---|---|
| 9,629,120 B2 * | 4/2017 | Ryu | ...................... | H04W 68/02 |
| 2006/0265378 A1 * | 11/2006 | Koseki | .............. | G06F 17/30067 |
| 2012/0268433 A1 | 10/2012 | Horii et al. | | |
| 2013/0042296 A1 * | 2/2013 | Hastings | ................. | G06F 21/10 726/1 |
| 2013/0083003 A1 * | 4/2013 | Perez | ...................... | G06F 3/005 345/419 |
| 2013/0293586 A1 * | 11/2013 | Kaino | .................... | G08G 1/005 345/633 |

(Continued)

FOREIGN PATENT DOCUMENTS

JP 2012-231259 A 11/2012

*Primary Examiner* — Joe H Cheng
(74) *Attorney, Agent, or Firm* — Hauptman Ham, LLP

(57) ABSTRACT

A head-mounted display includes an interface capable of connecting thereto a cartridge of which a return condition is recorded, and a controller configured to determine whether, when the cartridge is connected to the interface, the return condition has been satisfied. When it is determined that the return condition has been satisfied, the controller is configured to execute notification for requesting a user to return the cartridge.

10 Claims, 11 Drawing Sheets

(56) References Cited

U.S. PATENT DOCUMENTS

| | | | | |
|---|---|---|---|---|
| 2014/0002495 A1* | 1/2014 | Lamb | G06F 3/1431 | 345/633 |
| 2014/0016800 A1* | 1/2014 | Dong | G02B 27/02 | 381/151 |
| 2014/0168266 A1* | 6/2014 | Kimura | G02B 27/0172 | 345/633 |
| 2014/0368980 A1* | 12/2014 | Nanavati | G06Q 30/016 | 361/679.03 |
| 2015/0099946 A1* | 4/2015 | Sahin | A61B 5/16 | 600/301 |
| 2015/0223731 A1* | 8/2015 | Sahin | A61B 5/16 | 600/301 |
| 2016/0049012 A1* | 2/2016 | Torii | G06T 19/006 | 345/633 |
| 2016/0062514 A1* | 3/2016 | Jo | G02B 27/017 | 345/174 |
| 2016/0317915 A1* | 11/2016 | Onda | A63F 13/2145 | |
| 2016/0344882 A1* | 11/2016 | Tsujioka | G06F 3/011 | |
| 2017/0152729 A1* | 6/2017 | Gleitman | E21B 41/00 | |
| 2017/0153672 A1* | 6/2017 | Shin | H04M 1/23 | |
| 2017/0227779 A1* | 8/2017 | Kato | G02B 27/02 | |
| 2017/0262045 A1* | 9/2017 | Rouvinez | G06F 3/011 | |
| 2017/0272604 A1* | 9/2017 | Nakatani | H04N 1/32448 | |
| 2017/0276941 A1* | 9/2017 | Fujihara | G02B 27/017 | |
| 2017/0276949 A1* | 9/2017 | Okada | G09G 3/36 | |
| 2017/0276950 A1* | 9/2017 | Ozawa | G02B 27/0172 | |
| 2017/0277221 A1* | 9/2017 | Degawa | G06F 1/163 | |
| 2017/0277223 A1* | 9/2017 | Matsuzawa | G06F 1/1632 | |
| 2017/0278453 A1* | 9/2017 | Kurosaki | G09G 3/2096 | |

\* cited by examiner

HEAD-MOUNTED DISPLAY

CROSS-REFERENCE TO RELATED APPLICATION(S)

The present application claims priority to and incorporates by reference the entire contents of Japanese Patent Application No. 2016-064382 filed in Japan on Mar. 28, 2016.

BACKGROUND

1. Field

The present application relates to a head-mounted display.

2. Description of the Related Art

Conventionally, there has been a display device to be worn on the head.

SUMMARY

A head-mounted display according to one aspect includes an interface capable of connecting thereto a cartridge of which a return condition is recorded, and a controller configured to determine whether, when the cartridge is connected to the interface, the return condition has been satisfied. When it is determined that the return condition has been satisfied, the controller is configured to execute notification for requesting a user to return the cartridge.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Further improved usability is desired for the display device described above. Embodiments of a head-mounted display according to the present application will be described in detail with reference to the drawings. A user of the head-mounted display according to the present application can receive various services via the head-mounted display, for example, by connecting a cartridge to the head-mounted display and causing the head-mounted display to read particular content from the cartridge. Cartridges which can be connected to the head-mounted display may be provided from various facilities capable of providing services via the head-mounted display, irrespective of whether such facilities are outdoor or indoor facilities. Examples of the facilities include business parks, shopping centers, fashion buildings, parks, amusement facilities, high-tech parks, and residential facilities.

Figure 1:
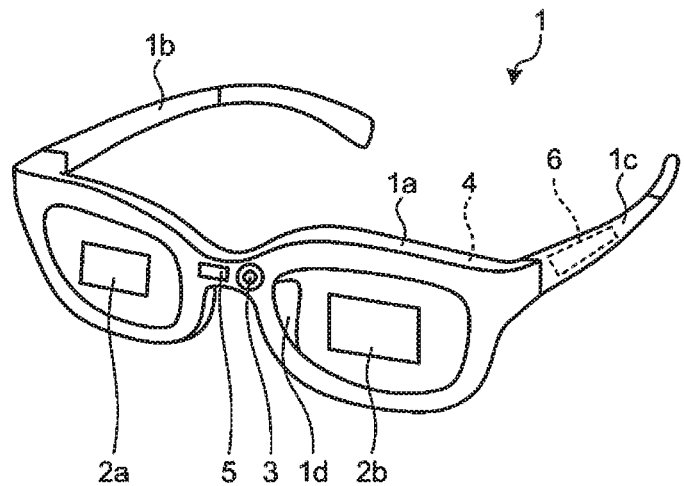
FIG. 1 is a view illustrating a schematic configuration of an appearance of a head-mounted display according to embodiments.

FIG. 1 is a view illustrating a schematic configuration of an appearance of the head-mounted display according to embodiments. As illustrated in FIG. 1, a head-mounted display 1 has a spectacles-shape and includes a front portion 1a, temple portions 1b and 1c, and support portions 1d. The shape of the head-mounted display 1 illustrated in FIG. 1 is by way of example only. There is no limitation to the shape illustrated in FIG. 1 as long as a function as a wearable device to be worn on the head can be realized.

The front portion 1a is formed in such a manner as to surround at least a part of peripheral portions of displays 2a and 2b. The front portion 1a is a portion arranged before the eyes of the user of the head-mounted display 1 when the user wears the head-mounted display 1. The support portions 1d are in a pair (not illustrated) and contact the nose of the user of the head-mounted display 1 in such a manner as to sandwich the nose therebetween when the user wears the head-mounted display 1. The support portions 1d make a contribution, when the user wears the head-mounted display 1, towards supporting the head-mounted display 1 in such a manner that the head-mounted display 1 is prevented from slipping down on the face of the user in a gravitational direction, and an attitude of the head-mounted display 1 being worn is maintained as far as possible.

The front portion 1a also includes imagers 3 and 4, a detector 5, and an operation unit 6. Each of the components included in the front portion 1a illustrated in FIG. 1 is by way of example only, and not limited to examples illustrated in FIG. 1

The temple portions 1b and 1c are formed in a similar rod-like shape. The temple portions 1b and 1c are portions respectively arranged along the temporal regions of the user of the head-mounted display 1 when the user wears the head-mounted display 1. One end portion of the temple portion 1b and one end portion of the temple portion 1c are parts foldably connected to the front portion 1a via a hinge (not illustrated), respectively. Another end portion of the temple portion 1b and another end portion of the temple portion 1c are parts respectively applied to the ears of the user of the head-mounted display 1 when the user wears the head-mounted display 1. As with the support portions 1d, the temple portions 1b and 1c make a contribution, when the user wears the head-mounted display 1, towards supporting the head-mounted display 1 in such a manner that the head-mounted display 1 is prevented from slipping down on the face of the user in the gravitational direction, and the attitude of the head-mounted display 1 being worn is maintained as far as possible.

Figure 2:
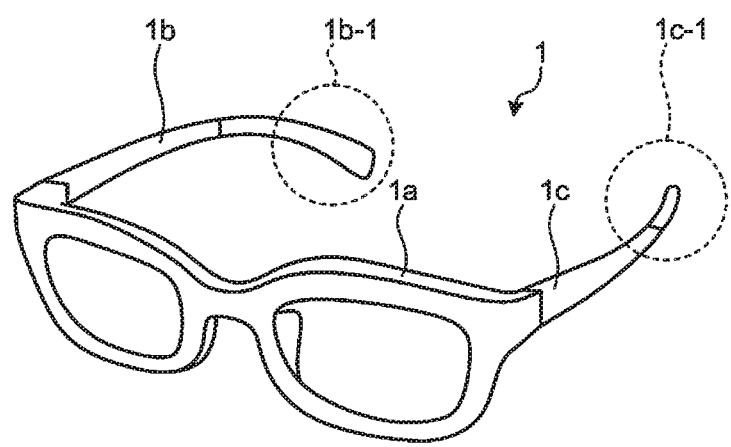
FIG. 2 is a view illustrating an example of a mounting position of an interface according to some embodiments.
Figure 3:
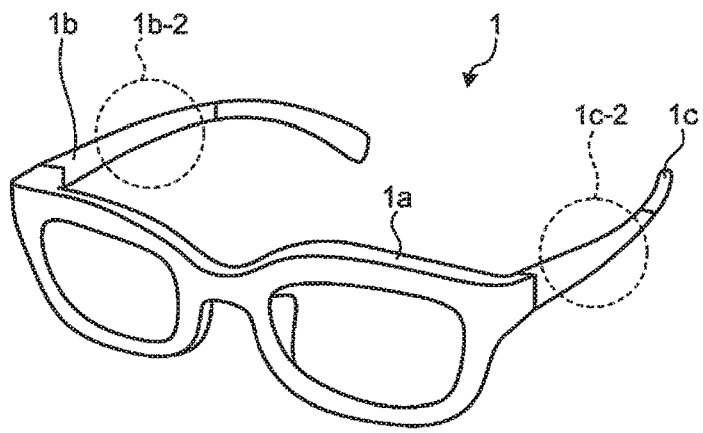
FIG. 3 is a view illustrating an example of the mounting position of the interface according to some embodiments.
Figure 4:
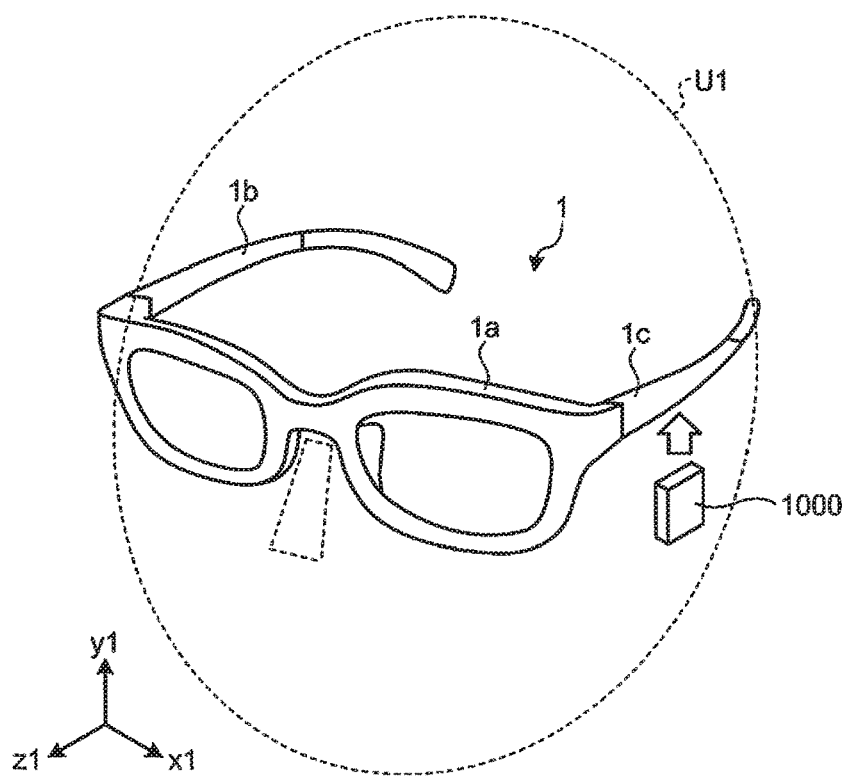
FIG. 4 is a view illustrating an example of an opening direction of the interface according to some embodiments.
Figure 5:
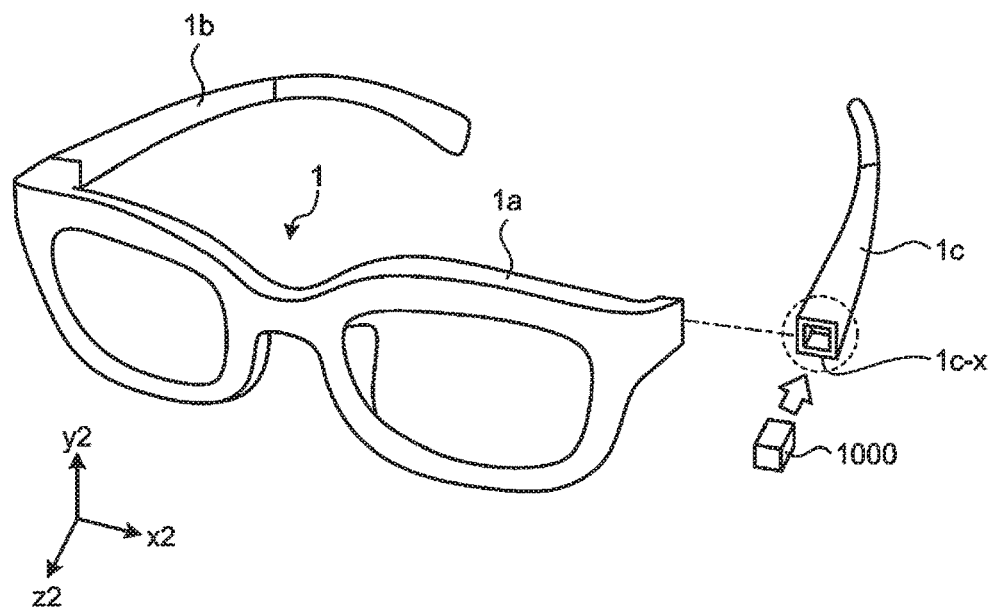
FIG. 5 is a view illustrating other examples of the mounting position and the opening direction of the interface according to some embodiments.
Figure 6:
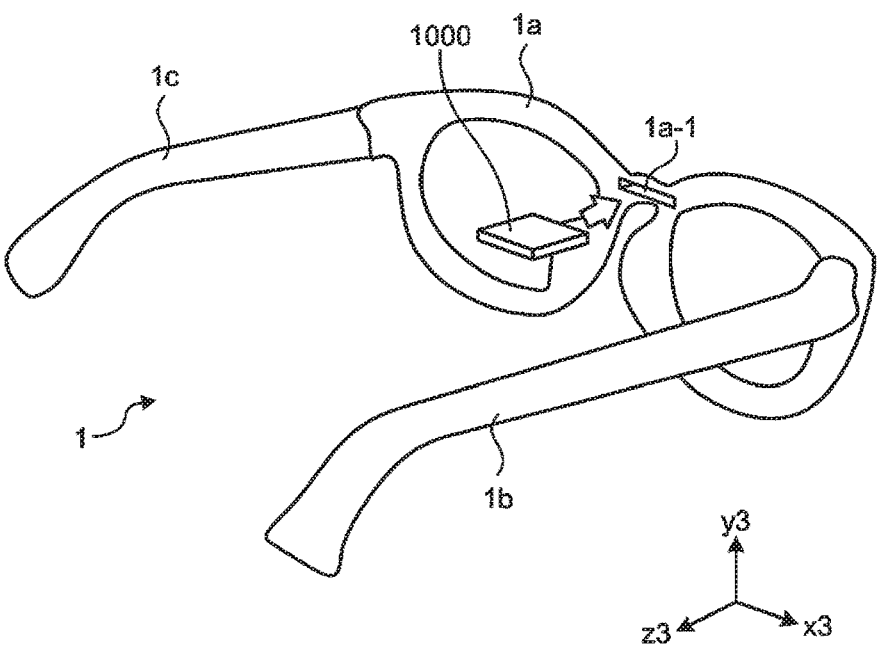
FIG. 6 is a view illustrating other examples of the mounting position and the opening direction of the interface according to some embodiments.

Hereinbelow, regarding an interface included in the head-mounted display, examples of a mounting position and an opening direction will be described by using FIGS. 2 to 6. FIGS. 2 and 3 are views illustrating the examples of the mounting position of the interface according to some embodiments. FIG. 4 is a view illustrating an example of the opening direction of the interface according to some embodiments. FIGS. 5 and 6 are views illustrating other examples of the mounting position and the opening direction of the interface according to some embodiments. Although it is not specifically illustrated in FIGS. 2 to 6, the head-mounted display 1 includes the interface for connecting a cartridge 1000 thereto.

As illustrated in FIG. 2, the interfaces can be mounted in the head-mounted display 1, in a near-end portion 1b-1 and a near-end portion 1c-1, respectively. The near-end portion 1b-1 is a portion near one of the end portions of the temple portion 1b, which is not connected to the front portion 1a. The near-end portion 1c-1 is a portion near one of the end portions of the temple portion 1c, which is not connected to the front portion 1a. Alternatively, as illustrated in FIG. 3, the interfaces can be mounted in the head-mounted display 1, in a near-center portion 1b-2 of the temple portion 1b and a near-center portion 1c-2 of the temple portion 1c, respectively. Regarding the head-mounted display 1, for example, in a case where the front portion 1a, which includes the imagers 3 and 4, the detector 5, the operation unit 6, and the like, is heavier than the temple portions 1b and 1c, it is possible to make the weight of the temple portion 1b (or the temple portion 1c) approximate to the weight of the front portion 1a by connecting the cartridge 1000 to the temple portion 1b (or the temple portion 1c). As a result, it is possible to achieve the head-mounted display 1 more comfortably worn.

In a case where the interfaces are mounted in the temple portions 1b and 1c, each interface is open downward in a vertical direction when the head-mounted display 1 is being worn by a user U1 (see FIG. 4) of the head-mounted display 1. With the above configuration, in the head-mounted display 1, it is possible to prevent dust and the like from entering the opening (a portion open toward outside) included in each interface.

The direction in which an interface 10 is open will be described by using FIG. 4. An x1-axis, a y1-axis, and a z1-axis of coordinate axes illustrated in FIG. 4 are assumed to be perpendicular to one another. In the example illustrated in FIG. 4, a longitudinal direction of the front portion 1a of the head-mounted display 1 is assumed to be coincide with a direction in parallel with a direction of the x1-axis of the coordinate axes illustrated in FIG. 4. The interface is open in a direction where the cartridge 1000 can be inserted in and connected to the head-mounted display 1. In the example illustrated in FIG. 4, although it is not explicitly illustrated in the figure, the interface is open, for example, in a direction downward in a vertical direction, in other words, in a direction in parallel with a negative direction of the y1-axis.

In the head-mounted display 1, as illustrated in FIGS. 2 and 3, the interfaces may be respectively mounted in the temple portions 1b and 1c, or the interface may be mounted in either one of the temple portions 1b and 1c.

Other examples of the mounting position and the opening direction of the interface will be described by using FIG. 5. An x2-axis, a y2-axis, and a z2-axis of coordinate axes illustrated in FIG. 5 are assumed to be perpendicular to one another. In the example illustrated in FIG. 5, a longitudinal direction of the front portion 1a of the head-mounted display 1 is assumed to be coincide with a direction in parallel with a direction of the x2-axis of the coordinate axes illustrated in FIG. 5. As illustrated in FIG. 5, in the head-mounted display 1, the interface can be mounted also in an abutment portion 1c-x of the temple portion 1c, which abutment portion is a position where the temple portion 1c contacts the front portion 1a when the temple portion 1c is completely opened. The interface is open in such a manner that the cartridge 1000 can be inserted therein and connected thereto. In the example illustrated in FIG. 5, the interface is illustrated which is open in a direction in parallel with a positive direction of the z2-axis of the coordinate axes illustrated in FIG. 5. With the above configuration, in the head-mounted display 1, the opening of the interface is closed by the front portion 1a when the temple portion 1c is completely opened, and as a result, it is possible to protect the cartridge 1000 against external impact and the like.

In the example illustrated in FIG. 5, the head-mounted display 1 may be defined to have an opening being open in a longitudinal direction of the temple portion 1b (or the temple portion 1c), in the temple portion 1b (or the temple portion 1c).

Other examples of the mounting position and the opening direction of the interface will be described by using FIG. 6. An x3-axis, a y3-axis, and a z3-axis of coordinate axes illustrated in FIG. 6 are assumed to be perpendicular to one another. In the example illustrated in FIG. 6, a longitudinal direction of the front portion 1a of the head-mounted display 1 is assumed to be coincide with a direction in parallel with a direction of the x3-axis of the coordinate axes illustrated in FIG. 6. As illustrated in FIG. 6, in the head-mounted display 1, the interface can be mounted in an area 1a-1. The area 1a-1 is an area in the front portion 1a, and faces the face of the user. The interface is open in such a manner that the cartridge 1000 can be inserted therein and connected thereto. In the example illustrated in FIG. 6, the interface is illustrated which is open in a direction in parallel with a positive direction of the z3-axis of the coordinate axes illustrated in FIG. 6. With the above configuration, in the head-mounted display 1, it is possible to protect the cartridge 1000, which is connected to the interface, against external impact and the like.

Figure 7:
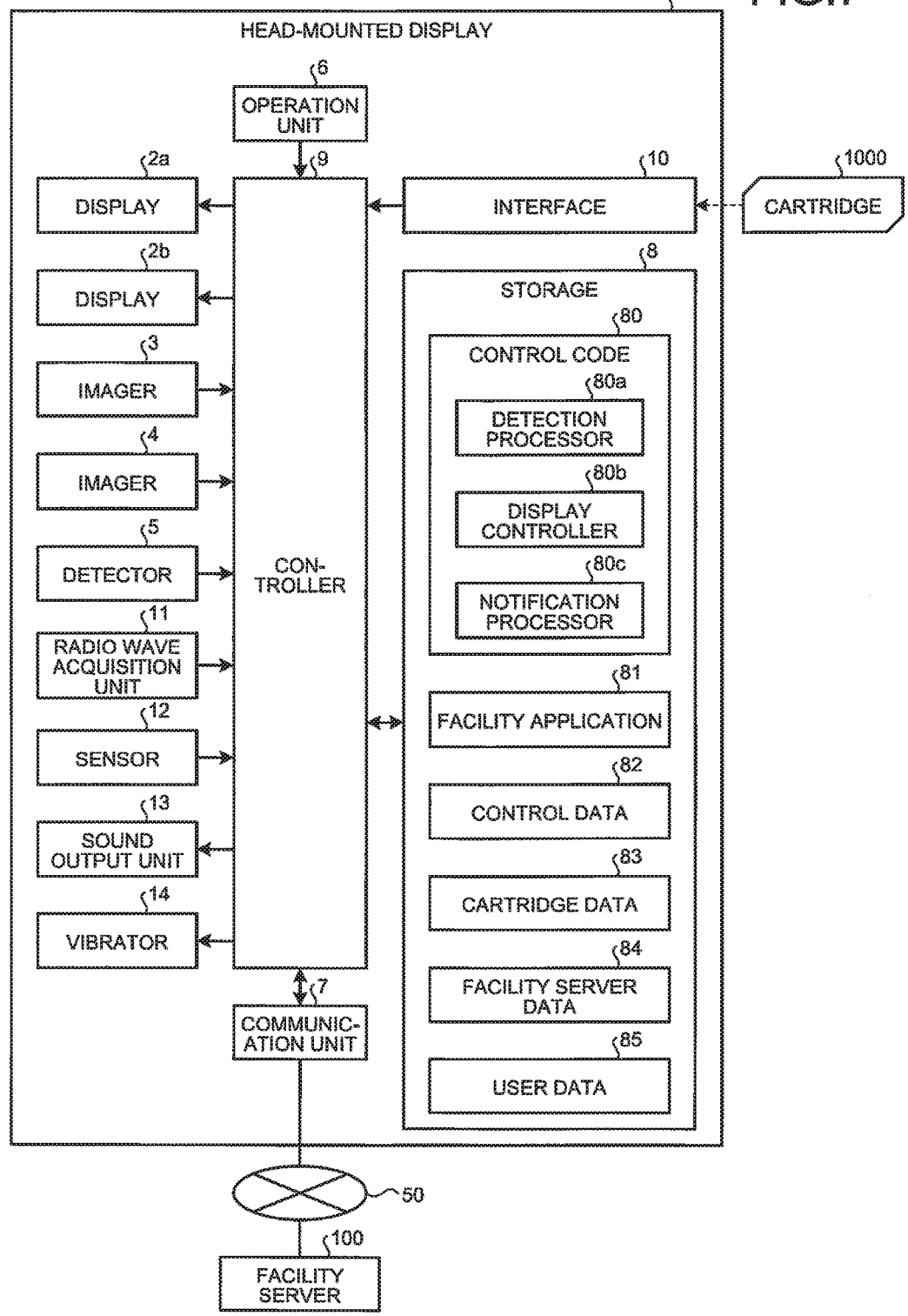
FIG. 7 is a block diagram illustrating an example of a functional configuration of the head-mounted display according to some embodiments.

FIG. 7 is a block diagram illustrating an example of a functional configuration of the head-mounted display according to some embodiments. As illustrated in FIG. 7, the head-mounted display 1 is configured to include the displays 2a and 2b, the imagers 3 and 4, the detector 5, the operation unit 6, a communication unit 7, a storage 8, a controller 9, the interface 10, a radio wave acquisition unit 11, a sensor 12, a sound output unit 13, and a vibrator 14.

The displays 2a and 2b may include a transflective or transmissive display device such as a liquid crystal display or an organic electro-luminescence (EL) panel. The displays 2a and 2b display various kinds of information in accordance with a control signal input from the controller 9. The displays 2a and 2b may be a projection device which projects an image on the retina of the user with a light source of, for example, laser light.

The imagers 3 and 4 electronically pick up an image by using an image sensor such as a charge coupled device (CCD) image sensor or a complementary metal oxide semiconductor (CMOS) image sensor. The imagers 3 and 4 convert the picked-up image into a signal, and output the signal to the controller 9. The imager 3 is an out-camera which picks up an image of the foreground of the user wearing the head-mounted display 1, for example. The imager 4 is an in-camera which picks up an image of the user wearing the head-mounted display 1, for example.

The detector 5 executes various kinds of detection. The detector 5 is capable of detecting an object to be detected, a change in a state of the object to be detected, and the like, by using at least one of visible light, infrared light, ultraviolet light, a radio wave, a sonic wave, magnetism, and capacitance. Examples of the object to be detected include a stationary object, a moving object, a living organism, and a non-living material.

In some embodiments, the detector 5 can execute detection of information for determining whether the head-mounted display 1 is being worn by the user of the head-mounted display 1. For example, the detector 5 may include a light irradiator and a light-receiving unit. The controller 9 can determine that the head-mounted display 1 is being worn by the user in a case where the face of the user is irradiated with light from the light irradiator and the light-receiving unit detects reflected light reflected from the face. The detector 5 may include a capacitive contact detector provided at a position in the temple portion 1b, the temple portion 1c, or the support 1d, where it is possible to detect that the position is brought into proximity or contact with the face of the user when the user wears the head-mounted display 1. The controller 9 can determine whether the head-mounted display 1 is being worn by the user based on a contact detection result of the detector 5. The imager 4 may function as the detector 5. The controller 9 can determine whether the head-mounted display 1 is being worn by the user by analyzing an image picked up by the imager 4. The detector 5 can output, to the controller 9, a result of the detection of the light-receiving unit or the contact detection result of the contact detector as information for determining whether the head-mounted display 1 is being worn by the user of the head-mounted display 1. In a case where the imager 4 functions also as the detector 5, the imager 4 can output, to the controller 9, the picked-up image as information for determining whether the head-mounted display 1 is being worn by the user of the head-mounted display 1.

The operation unit 6 receives from the user an operation input, for example, for starting up or shutting down the head-mounted display 1, and changing various settings including an operation setting thereof. The operation unit 6 converts the operation input received from the user into a signal, and outputs the signal to the controller 9.

The communication unit 7 is capable of communicating with other devices. The communication unit 7 is capable of transmitting and receiving various kinds of information exchanged with a facility server 100 disposed in a facility, and the like, via a communication network 50 using a predetermined communication protocol, for example. The communication unit 7 is capable of supporting one or more of short range wireless communication standards. Examples of the short range wireless communication standard include IEEE802.11, Bluetooth (registered trademark), Infrared Data Association (IrDA), Near Field Communication (NFC), and Wireless Personal Area Network (WPAN).

The storage 8 stores a code and data therein. The code stored in the storage 8 includes a control code 80. An application stored in the storage 8 includes a facility application 81. The data stored in the storage 8 includes control data 82, cartridge data 83, facility server data 84, and user data 85.

The storage 8 may be used as a work area for temporarily storing a processing result of the controller 9. The storage 8 may be configured by any non-transitory storage medium such as a semiconductor storage medium and a magnetic storage medium. The storage 8 may include a plurality of kinds of storage media. The storage 8 may include a combination of a storage medium such as a memory card, an optical disc, or a magneto-optical disk, and a reader of the storage medium. The storage 8 may include a storage device used as a temporary storage area such as a random access memory (RAM). The code stored in the storage 8 may include a code (illustration omitted) which supports an operation of an application. The code, the application, and the data stored in the storage 8 may be acquired from other devices such as the facility server 100 through wireless or wired communication.

The control code 80 provides functions relating to various kinds of control of the head-mounted display 1. The functions provided by the control code 80 include a detection processor 80a, a display controller 80b, and a notification processor 80c.

The detection processor 80a provides a function to execute various kinds of control of the head-mounted display 1 based on a detection result of the detector 5. The display controller 80b provides a function to execute display control of the displays 2a and 2b.

The notification processor 80c provides a function to execute notification for requesting the user to return the cartridge 1000 when it is determined that a return condition of the cartridge 1000 has been satisfied. The functions provided by the notification processor 80c include a function to determine that the return condition has been satisfied when an application based on data acquired from the cartridge 1000 is terminated. The functions provided by the notification processor 80c include a function to determine that the return condition has been satisfied when a current position of the head-mounted display 1 is within a predetermined area. The functions provided by the notification processor 80c include a function to determine that the return condition has been satisfied when it is detected that the temple portions 1b and 1c have been folded. The functions provided by the notification processor 80c include a function to further determine whether the head-mounted display 1 is being worn by the user of the head-mounted display 1 when it is determined that the return condition has been satisfied. The functions provided by the notification processor 80c include a function to execute the notification using a volume not greater than a threshold when it is determined that the head-mounted display 1 is being worn by the user, and, on the other hand, to execute the notification using a volume greater than the threshold when it is determined that the head-mounted display 1 is not being worn by the user. The functions provided by the notification processor 80c include a function to execute the notification using an image output to at least one of the displays 2a and 2b when it is determined that the head-mounted display 1 is being worn by the user, and, on the other hand, to execute the notification using sound output from the sound output unit 13 when it is determined that the head-mounted display 1 is not being worn by the user. The functions provided by the notification processor 80c include a function to execute the notification using the sound output from the sound output unit 13 or vibration by the vibrator 14 when it is determined that the head-mounted display 1 is being worn by the user, and, on the other hand, to transmit a command to instruct the execution of the notification to other communication device via the communication unit 7 when it is determined that the head-mounted display 1 is not being worn by the user.

The functions provided by the control code 80 include the following functions in addition to the above functions. For example, the functions provided by the control code 80 include a function to determine whether the cartridge 1000 is being connected to the interface 10. For example, the functions provided by the control code 80 include a function to measure the current position of the head-mounted display 1 based on a radio wave received by the radio wave acquisition unit 11.

The facility application 81 is, for example, an application which provides a function with which the user of the head-mounted display 1 uses installations and devices disposed in the facilities via the head-mounted display 1. For example, in a case of an amusement park, the facility application 81 falls under an application for displaying various kinds of information regarding the amusement park, for example, a map of the amusement park, or outputting a moving image, sound, and the like when the user enjoys various attractions arranged in the amusement park. The facility application 81 may be configured as an application set including applications respectively corresponding to installations and devices when there are pluralities of installations and devices disposed in the facilities. The facility application 81 may be acquired from the cartridge 1000 connected to the interface 10.

The control data 82 is data used for various kinds of control of the head-mounted display 1 executed by the functions provided by the control code 80. In some embodiments, the control data 82 includes information of a predetermined area where the notification for requesting the user to return the cartridge 1000 is executed. For example, in a case of an amusement park, the predetermined area falls under an entrance area where the user moves at entry into or exit from the amusement park. The control data 82 includes a pattern of electronic sound output when executing the notification for requesting return of the cartridge 1000, data of a threshold for setting a volume of the electronic sound output when executing the notification for requesting return of the cartridge 1000, data of a voice message output instead of the electronic sound when executing the notification for requesting return of the cartridge 1000, and data of an image displayed when executing the notification for requesting return of the cartridge 1000. The control data 82 may be acquired from the cartridge 1000 connected to the interface 10.

The cartridge data 83 is data acquired from the cartridge 1000 connected to the interface 10. The cartridge data 83 includes data regarding the return condition of the cartridge 1000 and facility application reference data. The data regarding the return condition of the cartridge 1000 is set, for example, by a facility side which rents the cartridge 1000. The facility application reference data is used in a process executed by the facility application 81. For example, in a case of an amusement park, the facility application reference data is used in order for the facility application 81 to output content such as a moving image and sound to the head-mounted display 1 in accordance with a progression of a game in an attraction. When configured as an application set including applications respectively corresponding to installations and devices disposed in the facilities, the facility application reference data may be configured as a data set including data corresponding to each application.

The facility server data 84 is data provided from the facility server 100. For example, in a case of an amusement park, the facility server data 84 is used in order for the facility application 81 to cause the head-mounted display 1 to display various kinds of information regarding the amusement park other than information acquired from the cartridge 1000.

The user data 85 is data set by the user of the head-mounted display 1. For example, in some embodiments, the user data 85 includes information such as a telephone number and a mail address regarding other communication device, which is a destination of a command to instruct execution of notification for requesting the user to return the cartridge 1000 transmitted via the communication unit 7.

The controller 9 includes a processor. The processor may be configured to include, for example, a central processing unit (CPU), a system-on-a-chip (SoC), a micro control unit (MCU), a field-programmable gate array (FPGA), and a coprocessor, but there is no limitation to the case where the processor is configured to include the above devices. The controller 9 integrally controls operations of the head-mounted display 1 to realize various functions. Specifically, the controller 9 realizes various kinds of control of the head-mounted display 1 by executing a command included in the control code 80 stored in the storage 8 while referring to the control data 82 stored in the storage 8 if needed.

The interface 10 is open in such a manner that the cartridge 1000 can be connected thereto. When the cartridge 1000 is connected, the interface 10 outputs a connection detection signal to the controller 9. The connection detection signal is used for notifying the controller 9 that the cartridge 1000 has been connected. The interface 10 acquires, from the cartridge 1000 thus connected, data stored in the cartridge 1000, and outputs the acquired data to the controller 9.

The radio wave acquisition unit 11 acquires a radio wave signal used for measuring the current position of the head-mounted display 1. The radio wave acquisition unit 11 performs a demodulation process of the acquired radio wave signal and sends the processed signal to the controller 9. The radio wave acquisition unit 11 can acquire, for example, a radio wave signal of a predetermined frequency band from a GPS satellite.

The sensor 12 senses information for determining whether the temple portions 1b and 1c of the head-mounted display 1 are in a folded state. For example, the sensor 12 may include a light irradiator and a light-receiving unit. For example, the controller 9 can determine that the temple portions 1b and 1c of the head-mounted display 1 are in a folded state in a case where the front portion 1a is irradiated with light from the light irradiator and the light-receiving unit detects reflected light reflected from the front portion 1a. The imager 4 may function as the sensor 12. For example, the controller 9 can determine that the temple portions 1b and 1c of the head-mounted display 1 are in a folded state in a case where an image picked up by the imager 4 is analyzed and the temple portion 1b or 1c is detected. For example, the sensor 12 may include a hall integrated circuit (IC). At that time, in the head-mounted display 1, the hall IC is provided at one of the temple portion 1b (or the temple portion 1c) and the front portion 1a, and a magnet is provided at another of the temple portion 1b (or the temple portion 1c) and the front portion 1a. The controller 9 can determine that the temple portions 1b and 1c of the head-mounted display 1 are in a folded state in a case where magnetic force of the magnet is detected based on a detection result of the hall IC. The sensor 12 can output, to the controller 9, a result of the detection of the light-receiving unit or the detection result of the hall IC as information for determining whether the temple portions 1b and 1c of the head-mounted display 1 are in a folded state. In a case where the imager 4 functions also as the detector 5, the imager 4 can output, to the controller 9, the picked-up image as information for determining whether the head-mounted display 1 is being worn by the user of the head-mounted display 1.

The sound output unit 13 can output electronic sound for requesting the user to return the cartridge 1000. The sound output unit 13 can also output, instead of the electronic sound, a voice message for requesting the user to return the cartridge 1000.

The vibrator 14 can generate vibration perceptible by the user of the head-mounted display 1.

A flow of a process performed by the head-mounted display according to some embodiments will be described by using FIGS. 8 to 14. FIGS. 8 to 14 are flowcharts each illustrating an example of the process performed by the head-mounted display according to some embodiments.

Figure 8:
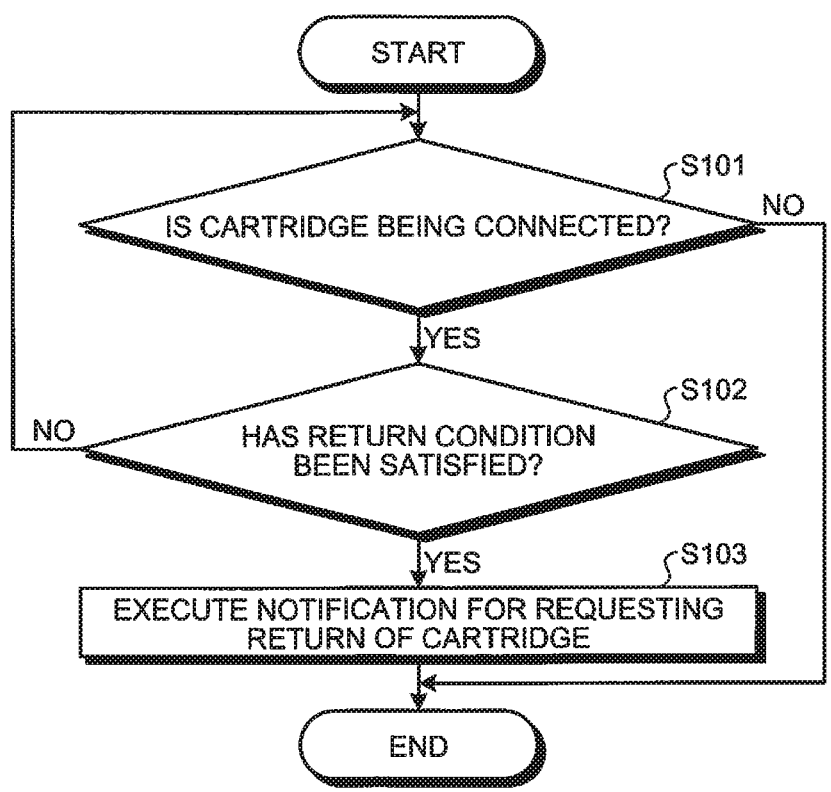
FIG. 8 is a flowchart illustrating an example of a process performed by the head-mounted display according to some embodiments.

An example of the process performed by the head-mounted display illustrated in FIG. 8 will be described. As illustrated in FIG. 8, the head-mounted display 1 determines whether the cartridge 1000 is being connected (Step S101).

In a case where the cartridge 1000 is not being connected as a result of the determination (Step S101, No), the head-mounted display 1 terminates the process illustrated in FIG. 8.

On the other hand, in a case where the cartridge 1000 is being connected as a result of the determination (Step S101, Yes), the head-mounted display 1 determines whether a return condition of the cartridge 1000 has been satisfied (Step S102). Individual cases where the return condition is satisfied will be described below by using FIGS. 9 to 11.

In a case where the return condition of the cartridge 1000 has not been satisfied as a result of the determination (Step S102, No), the head-mounted display 1 returns to the determination at Step S101 above.

On the other hand, in a case where the return condition of the cartridge 1000 has been satisfied as a result of the determination (Step S102, Yes), the head-mounted display 1 executes notification for requesting return of the cartridge 1000 (Step S103), and terminates the process illustrated in FIG. 8.

Figure 9:
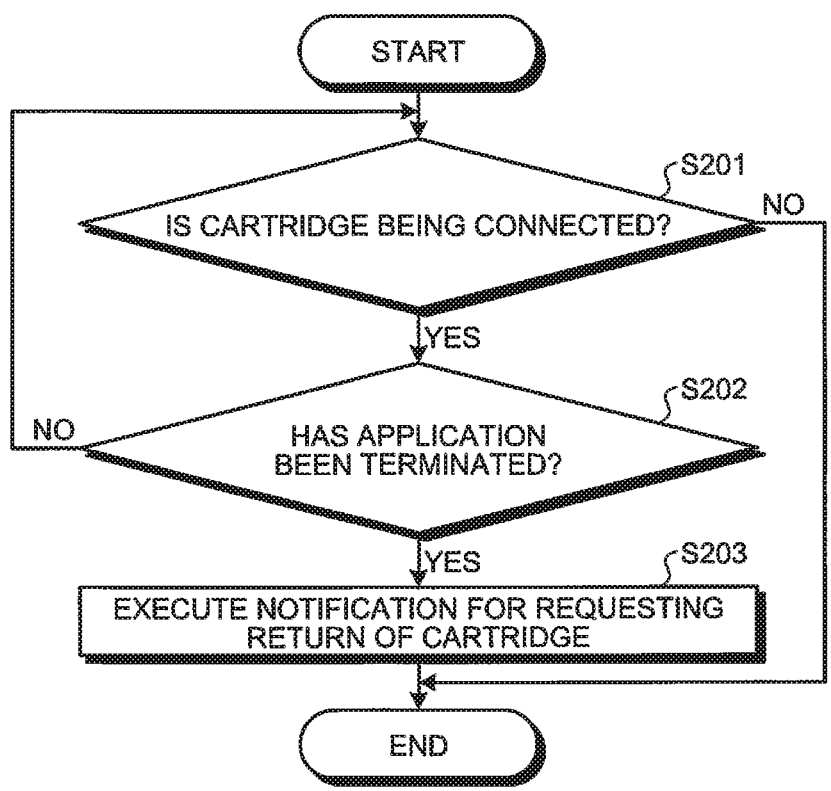
FIG. 9 is a flowchart illustrating an example of the process performed by the head-mounted display according to some embodiments.

An example of the process performed by the head-mounted display illustrated in FIG. 9 will be described. As illustrated in FIG. 9, the head-mounted display 1 determines whether the cartridge 1000 is being connected (Step S201).

In a case where the cartridge 1000 is not being connected as a result of the determination (Step S201, No), the head-mounted display 1 terminates the process illustrated in FIG. 9.

On the other hand, in a case where the cartridge 1000 is being connected as a result of the determination (Step S201, Yes), the head-mounted display 1 determines whether an application based on data acquired from the cartridge 1000 has been terminated (Step S202). A case where the application based on data acquired from the cartridge 1000 has been terminated includes, for example, a case where the facility application 81 reproduces content such as a moving image and sound in accordance with a progression of a game in an attraction based on the facility application reference data included in the cartridge data 83.

In a case where the application based on data acquired from the cartridge 1000 has not been terminated as a result of the determination (Step S202, No), the head-mounted display 1 returns to the determination at Step S201 above.

On the other hand, in a case where the application based on data acquired from the cartridge 1000 has been terminated as a result of the determination (Step S202, Yes), the head-mounted display 1 executes notification for requesting return of the cartridge 1000 (Step S203), and terminates the process illustrated in FIG. 9.

Figure 10:
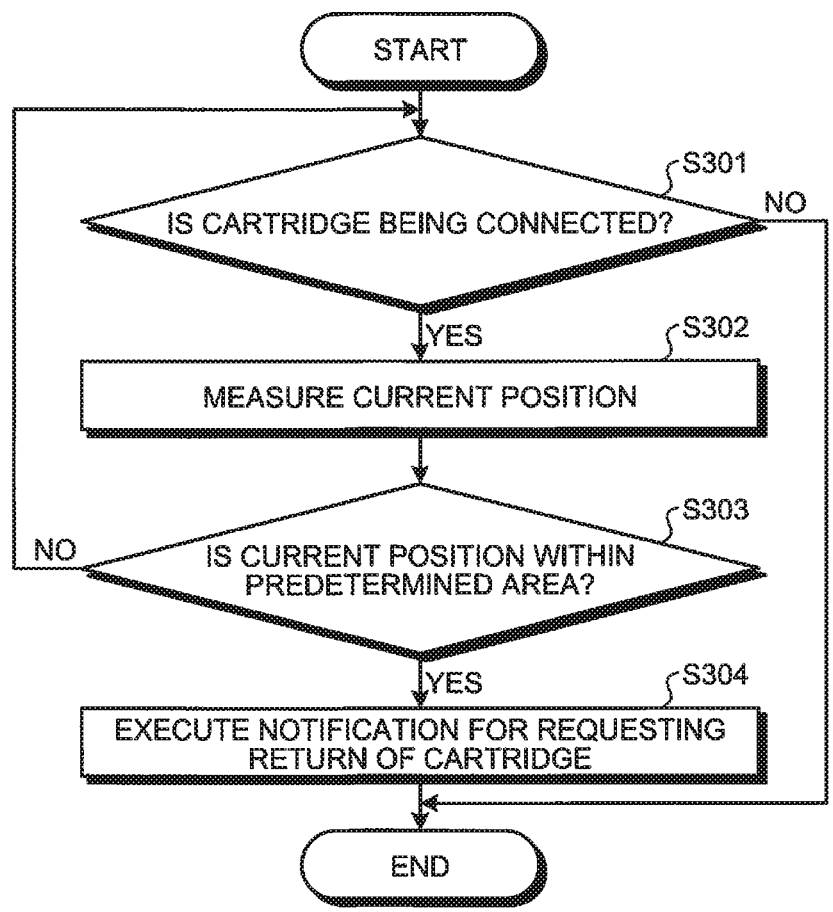
FIG. 10 is a flowchart illustrating an example of the process performed by the head-mounted display according to some embodiments.

An example of the process performed by the head-mounted display illustrated in FIG. 10 will be described. As illustrated in FIG. 10, the head-mounted display 1 determines whether the cartridge 1000 is being connected (Step S301).

In a case where the cartridge 1000 is not being connected as a result of the determination (Step S301, No), the head-mounted display 1 terminates the process illustrated in FIG. 10.

On the other hand, in a case where the cartridge 1000 is being connected as a result of the determination (Step S301, Yes), the head-mounted display 1 measures a current position of the head-mounted display 1 (Step S302).

Subsequently, the head-mounted display 1 determines whether the current position is within a predetermined area (Step S303).

In a case where the current position is not within the predetermined area as a result of the determination (Step S303, No), the head-mounted display 1 returns to the determination at Step S301 above.

On the other hand, in a case where the current position is within the predetermined area as a result of the determination (Step S303, Yes), the head-mounted display 1 executes notification for requesting return of the cartridge 1000 (Step S304), and terminates the process illustrated in FIG. 10.

Figure 11:
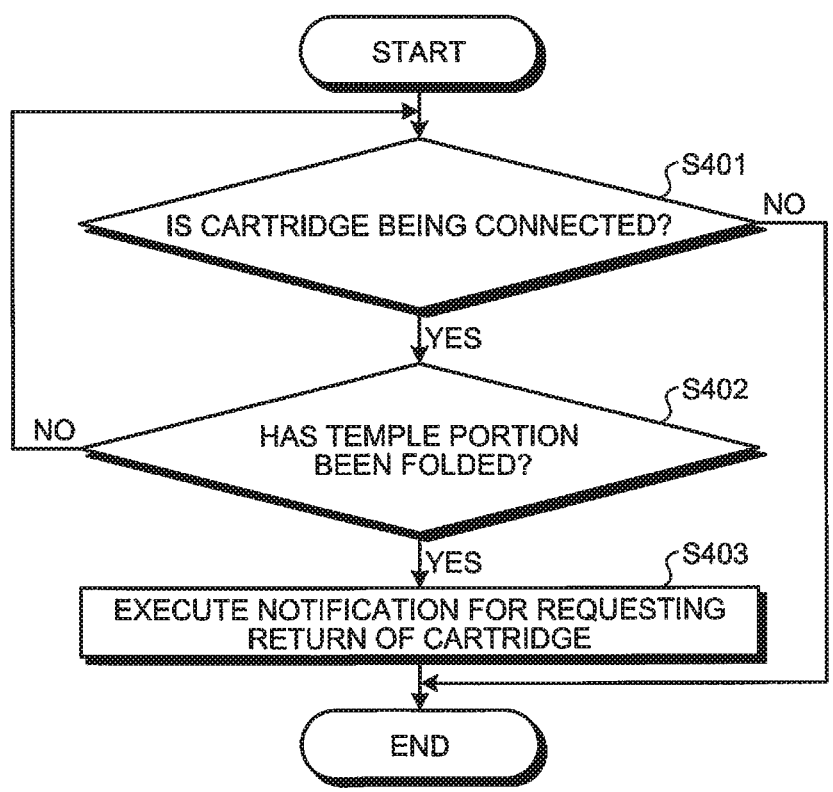
FIG. 11 is a flowchart illustrating an example of the process performed by the head-mounted display according to some embodiments.

An example of the process performed by the head-mounted display illustrated in FIG. 11 will be described. As illustrated in FIG. 11, the head-mounted display 1 determines whether the cartridge 1000 is being connected (Step S401).

In a case where the cartridge 1000 is not being connected as a result of the determination (Step S401, No), the head-mounted display 1 terminates the process illustrated in FIG. 11.

On the other hand, in a case where the cartridge 1000 is being connected as a result of the determination (Step S401, Yes), the head-mounted display 1 determines whether it has been detected that a temple portion has been folded (Step S402). The temple portion falls under the temple portions 1b and 1c illustrated in FIGS. 1 to 6.

In a case where it has not been detected that the temple portion has been folded as a result of the determination (Step S402, No), the head-mounted display 1 returns to the determination at Step S401 above.

On the other hand, in a case where it has been detected that the temple portion has been folded as a result of the determination (Step S402, Yes), the head-mounted display 1 executes notification for requesting return of the cartridge 1000 (Step S403), and terminates the process illustrated in FIG. 11.

Figure 12:
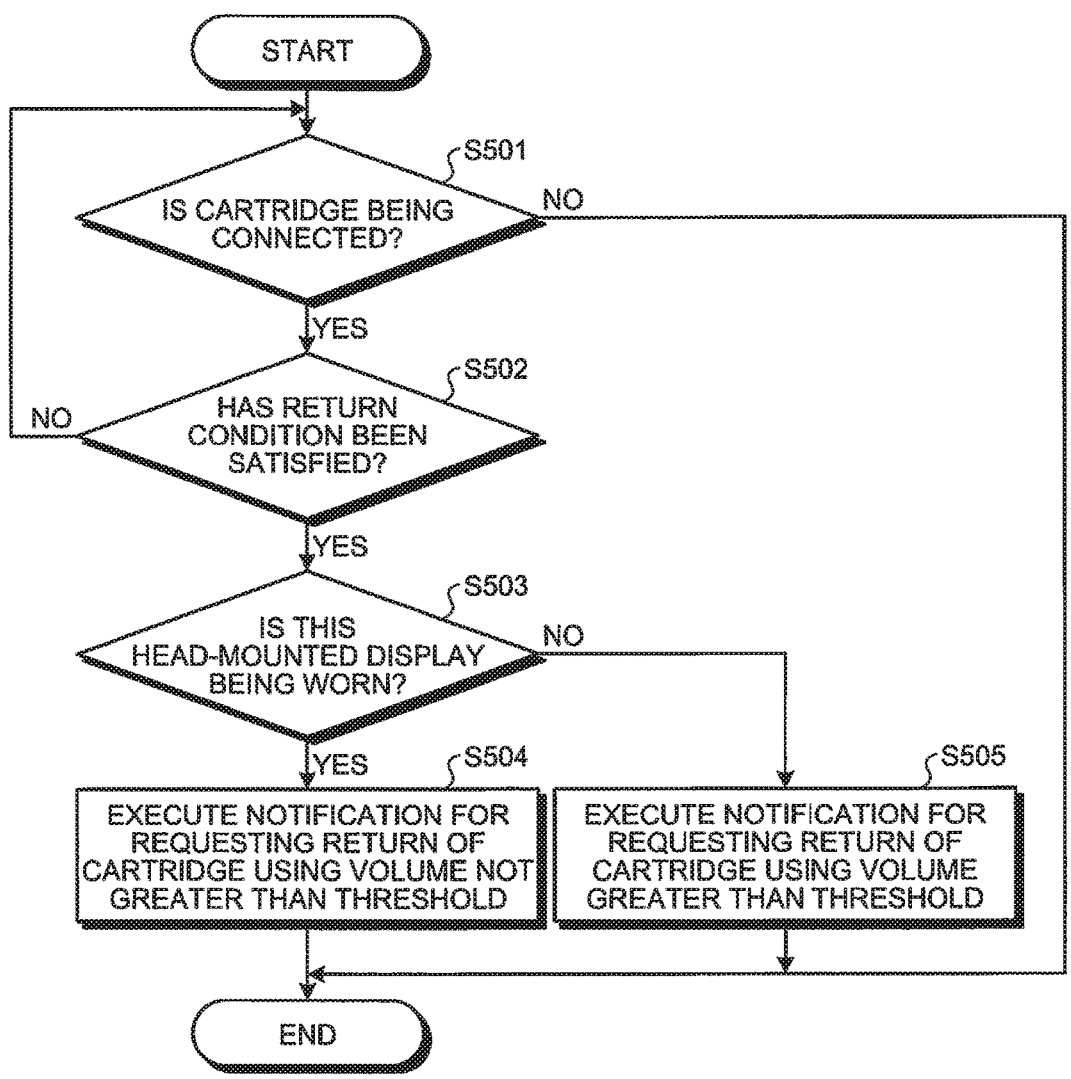
FIG. 12 is a flowchart illustrating an example of the process performed by the head-mounted display according to some embodiments.

An example of the process performed by the head-mounted display illustrated in FIG. 12 will be described. As illustrated in FIG. 12, the head-mounted display 1 determines whether the cartridge 1000 is being connected (Step S501).

In a case where the cartridge 1000 is not being connected as a result of the determination (Step S501, No), the head-mounted display 1 terminates the process illustrated in FIG. 12.

On the other hand, in a case where the cartridge 1000 is being connected as a result of the determination (Step S501, Yes), the head-mounted display 1 determines whether a return condition of the cartridge 1000 has been satisfied (Step S502). For example, as described by using FIGS. 9 to 11, a case where the application based on data acquired from the cartridge 1000 has been terminated, a case where the current position of the head-mounted display 1 is within the predetermined area, and a case where it has been detected that the temple portions 1*b* and 1*c* have been folded fall under the case where the return condition is satisfied.

In a case where the return condition of the cartridge 1000 has not been satisfied as a result of the determination (Step S502, No), the head-mounted display 1 returns to the determination at Step S501 above.

On the other hand, in a case where the return condition of the cartridge 1000 has been satisfied as a result of the determination (Step S502, Yes), the head-mounted display 1 determines whether the head-mounted display 1 is being worn by the user (Step S503).

In a case where the head-mounted display 1 is being worn by the user as a result of the determination (Step S503, Yes), the head-mounted display 1 executes notification for requesting return of the cartridge 1000 using a volume not greater than a threshold (Step S504), and terminates the process illustrated in FIG. 12.

On the other hand, in a case where the head-mounted display 1 is not being worn by the user as a result of the determination (Step S503, No), the head-mounted display 1 executes the notification for requesting return of the cartridge 1000 using a volume greater than the threshold (Step S505), and terminates the process illustrated in FIG. 12.

Figure 13:
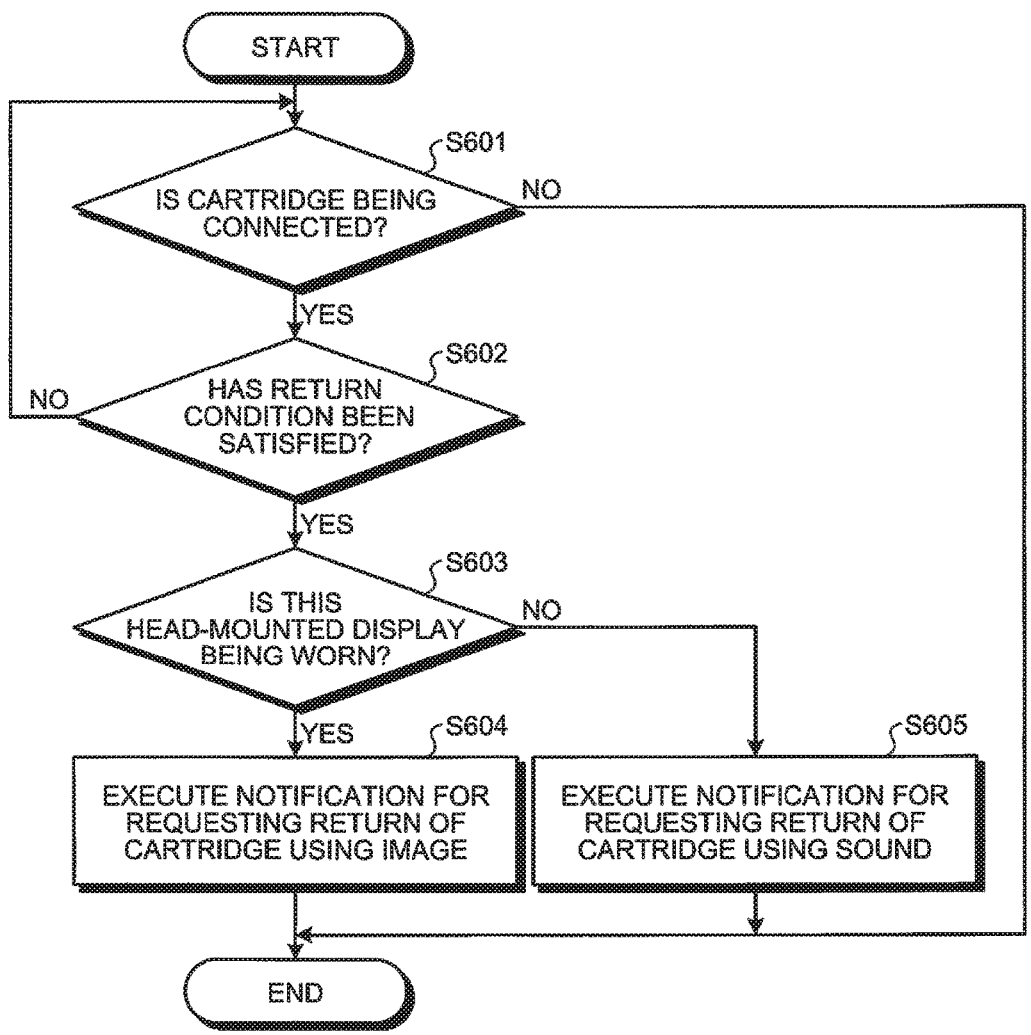
FIG. 13 is a flowchart illustrating an example of the process performed by the head-mounted display according to some embodiments.

An example of the process performed by the head-mounted display illustrated in FIG. 13 will be described. As illustrated in FIG. 13, the head-mounted display 1 determines whether the cartridge 1000 is being connected (Step S601).

In a case where the cartridge 1000 is not being connected as a result of the determination (Step S601, No), the head-mounted display 1 terminates the process illustrated in FIG. 13.

On the other hand, in a case where the cartridge 1000 is being connected as a result of the determination (Step S601, Yes), the head-mounted display 1 determines whether a return condition of the cartridge 1000 has been satisfied (Step S602). For example, as described by using FIGS. 9 to 11, a case where the application based on data acquired from the cartridge 1000 has been terminated, a case where the current position of the head-mounted display 1 is within the predetermined area, and a case where it has been detected that the temple portions 1*b* and 1*c* have been folded fall under the case where the return condition is satisfied.

In a case where the return condition of the cartridge 1000 has not been satisfied as a result of the determination (Step S602, No), the head-mounted display 1 returns to the determination at Step S601 above.

On the other hand, in a case where the return condition of the cartridge 1000 has been satisfied as a result of the determination (Step S602, Yes), the head-mounted display 1 determines whether the head-mounted display 1 is being worn by the user (Step S603).

In a case where the head-mounted display 1 is being worn by the user as a result of the determination (Step S603, Yes), the head-mounted display 1 executes notification for requesting return of the cartridge 1000 using an image (Step S604), and terminates the process illustrated in FIG. 13.

On the other hand, in a case where the head-mounted display 1 is not being worn by the user as a result of the determination (Step S603, No), the head-mounted display 1 executes the notification for requesting return of the cartridge 1000 using sound (Step S605), and terminates the process illustrated in FIG. 13.

Figure 14:
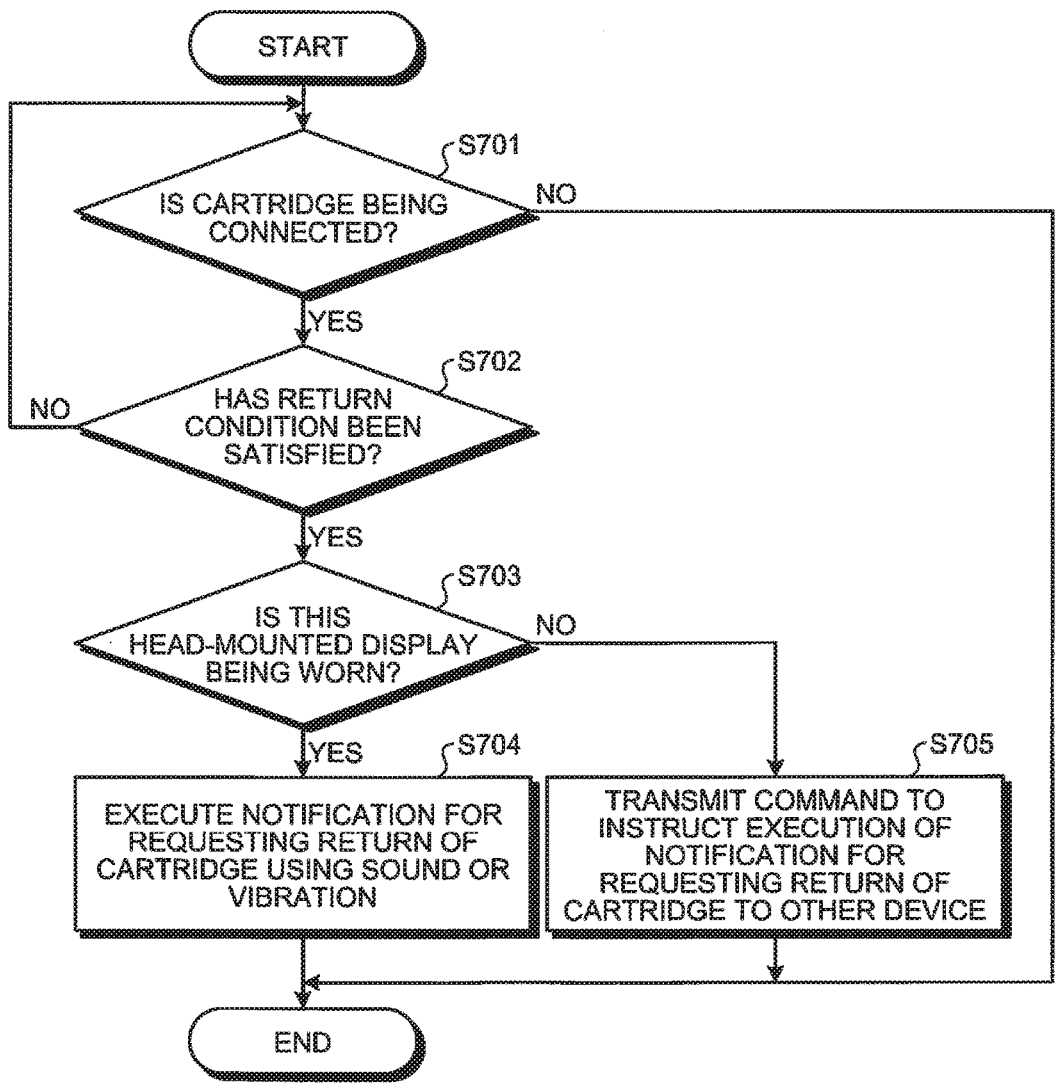
FIG. 14 is a flowchart illustrating an example of the process performed by the head-mounted display according to some embodiments.

An example of the process performed by the head-mounted display illustrated in FIG. 14 will be described. As illustrated in FIG. 14, the head-mounted display 1 determines whether the cartridge 1000 is being connected (Step S701).

In a case where the cartridge 1000 is not being connected as a result of the determination (Step S701, No), the head-mounted display 1 terminates the process illustrated in FIG. 14.

On the other hand, in a case where the cartridge 1000 is being connected as a result of the determination (Step S701, Yes), the head-mounted display 1 determines whether a return condition of the cartridge 1000 has been satisfied (Step S702). For example, as described by using FIGS. 9 to 11, a case where the application based on data acquired from the cartridge 1000 has been terminated, a case where the current position of the head-mounted display 1 is within the predetermined area, and a case where it has been detected that the temple portions 1*b* and 1*c* have been folded fall under the case where the return condition is satisfied.

In a case where the return condition of the cartridge 1000 has not been satisfied as a result of the determination (Step S702, No), the head-mounted display 1 returns to the determination at Step S701 above.

On the other hand, in a case where the return condition of the cartridge 1000 has been satisfied as a result of the determination (Step S702, Yes), the head-mounted display 1 determines whether the head-mounted display 1 is being worn by the user (Step S703).

In a case where the head-mounted display 1 is being worn by the user as a result of the determination (Step S703, Yes), the head-mounted display 1 executes notification for requesting return of the cartridge 1000 using sound output from the sound output unit 13 or vibration by the vibrator 14 (Step S704), and terminates the process illustrated in FIG. 14.

On the other hand, in a case where the head-mounted display 1 is not being worn by the user as a result of the determination (Step S703, No), the head-mounted display 1 transmits a command to request execution of the notification for requesting return of the cartridge 1000 to other device (Step S705), and terminates the process illustrated in FIG. 14.

In some embodiments above, the head-mounted display 1 executes notification for requesting the user to return the cartridge 1000 using, for example, electronic sound, a voice, or an image, in a case where the return condition of the cartridge 1000 being connected has been satisfied. Accordingly, it is possible to prevent the user of the head-mounted display 1 from forgetting to return the cartridge 1000 rented by facilities when using the facilities. Consequently, there is no need for the user of the head-mounted display 1 to bear return of a cartridge in mind when using the cartridge since the head-mounted display 1 executes notification for requesting the return thereof, and therefore, it is possible to improve usability of the head-mounted display 1 when using the facilities.

In some embodiments above, regarding the case where the return condition of the cartridge 1000 has been satisfied, the examples of the notification operation executed when the head-mounted display 1 is being worn by the user and the examples of the notification operation executed when the head-mounted display 1 is not being worn by the user have been described with reference to FIGS. 12 to 14. However, the notification operations executed by the head-mounted display 1 may be executed differently from the notification operations described using FIGS. 12 to 14. For example, the head-mounted display 1 may use an image for notification for requesting return of the cartridge 1000. Specifically, when the head-mounted display 1 is being worn by the user, the head-mounted display 1 executes the notification for requesting return of the cartridge 1000 using an image with luminance, saturation, or brightness not greater than a threshold on condition that the return condition of the cartridge 1000 is satisfied. On the other hand, when the head-mounted display 1 is not being worn by the user, the head-mounted display 1 executes the notification for requesting return of the cartridge 1000 using an image with luminance, saturation, or brightness greater than the threshold on condition that the return condition of the cartridge 1000 is satisfied. The head-mounted display 1 may use vibration for the notification for requesting return of the cartridge 1000. Specifically, when the head-mounted display 1 is being worn by the user, the head-mounted display 1 executes the notification for requesting return of the cartridge 1000 by operating the vibrator 14 to generate vibration with amplitude not greater than a threshold on condition that the return condition of the cartridge 1000 is satisfied. On the other hand, when the head-mounted display 1 is not being worn by the user, the head-mounted display 1 executes the notification for requesting return of the cartridge 1000 by operating the vibrator 14 to generate vibration with amplitude greater than the threshold on condition that the return condition of the cartridge 1000 is satisfied. The head-mounted display 1 may use light emission for the notification for requesting return of the cartridge 1000. Specifically, the head-mounted display 1 includes a light emitter such as a light-emitting diode (LED). When the head-mounted display 1 is being worn by the user, the head-mounted display 1 executes the notification for requesting return of the cartridge 1000 using an image, sound, or vibration on condition that the return condition of the cartridge 1000 is satisfied. On the other hand, when the head-mounted display 1 is not being worn by the user, the head-mounted display 1 executes the notification for requesting return of the cartridge 1000 by operating the light emitter to emit light on condition that the return condition of the cartridge 1000 is satisfied.

When measuring a current position, the head-mounted display 1 may acquire a radio wave transmitted from a wireless local area network (LAN) disposed in the facilities to measure the current position. Alternatively, in a case where the communication unit 7 is capable of supporting a communication standard for cellular phones such as 2G, 3G, and 4G, the head-mounted display 1 may acquire a radio wave transmitted from a cellular base station to measure the current position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-mounted display, comprising:
    an interface capable of connecting thereto a cartridge of which a return condition is recorded;
    a controller configured to determine whether, when the cartridge is connected to the interface, the return condition has been satisfied,
        wherein when it is determined that the return condition has been satisfied, the controller is configured to execute notification for requesting a user to return the cartridge;
    at least one display;
    a front portion formed in such a manner as to surround at least a part of peripheral portion of the at least one display; and
    a temple portion foldably connected to the front portion via a hinge, wherein
    in a case where it is detected that the temple portion has been folded, the controller is configured to determine that the return condition has been satisfied.

2. The head-mounted display according to claim 1, further comprising:
    a sound output unit;
    a vibrator; and
    a communication unit, wherein
    when it is determined that the return condition has been satisfied, the controller is further configured to determine whether the head-mounted display is being worn by the user of the head-mounted display,
    in a case where the head-mounted display is being worn by the user, the controller is configured to execute the notification using sound output from the sound output unit, or vibration by the vibrator, and
    in a case where the head-mounted display is not being worn by the user, the controller is configured to transmit a command to instruct execution of the notification to other communication device via the communication unit.

3. The head-mounted display according to claim 1, wherein in a case where an application based on data acquired from the cartridge has been terminated, the controller is configured to determine that the return condition has been satisfied.

4. The head-mounted display according to claim 1, wherein in a case where a current position of the head-mounted display is within a predetermined area, the controller is configured to determine that the return condition has been satisfied.

5. A head-mounted display, comprising:
    an interface capable of connecting thereto a cartridge of which a return condition is recorded;
    a controller configured to determine whether, when the cartridge is connected to the interface, the return condition has been satisfied,
        wherein when it is determined that the return condition has been satisfied, the controller is configured to execute notification for requesting a user to return the cartridge; and
    a sound output unit, wherein
    when it is determined that the return condition has been satisfied, the controller is further configured to determine whether the head-mounted display is being worn by the user of the head-mounted display,
    in a case where the head-mounted display is being worn by the user, the controller is configured to execute the notification using a volume not greater than a threshold, and in a case where the head-mounted display is not being worn by the user, the controller is configured to execute the notification using a volume greater than the threshold.

6. The head-mounted display according to claim 5, wherein in a case where an application based on data acquired from the cartridge has been terminated, the controller is configured to determine that the return condition has been satisfied.

7. The head-mounted display according to claim 5, wherein in a case where a current position of the head-mounted display is within a predetermined area, the controller is configured to determine that the return condition has been satisfied.

8. A head-mounted display, comprising:
an interface capable of connecting thereto a cartridge of which a return condition is recorded;
a controller configured to determine whether, when the cartridge is connected to the interface, the return condition has been satisfied, wherein
when it is determined that the return condition has been satisfied, the controller is configured to execute notification for requesting a user to return the cartridge;
at least one display; and
a sound output unit, wherein
when it is determined that the return condition has been satisfied, the controller is further configured to determine whether the head-mounted display is being worn by the user of the head-mounted display,
in a case where the head-mounted display is being worn by the user, the controller is configured to execute the notification using an image output to the at least one display, and
in a case where the head-mounted display is not being worn by the user, the controller is configured to execute the notification using sound output from the sound output unit.

9. The head-mounted display according to claim 8, wherein in a case where an application based on data acquired from the cartridge has been terminated, the controller is configured to determine that the return condition has been satisfied.

10. The head-mounted display according to claim 8, wherein in a case where a current position of the head-mounted display is within a predetermined area, the controller is configured to determine that the return condition has been satisfied.

* * * * *